(12) United States Patent
Mullen

(10) Patent No.: US 8,182,044 B2
(45) Date of Patent: May 22, 2012

(54) ENERGY ABSORPTION APPARATUS

(75) Inventor: Mike Mullen, Woking (GB)

(73) Assignee: Jankel Armouring Ltd. (GB)

( * ) Notice: Subject to any disclaimer, the term of this patent is extended or adjusted under 35 U.S.C. 154(b) by 334 days.

(21) Appl. No.: 12/503,673

(22) Filed: Jul. 15, 2009

(65) Prior Publication Data

US 2011/0006567 A1     Jan. 13, 2011

(30) Foreign Application Priority Data

Jul. 7, 2009   (GB) .................................. 0911760.7

(51) Int. Cl.
*B60R 21/00* (2006.01)
*B60N 2/42* (2006.01)
*F16F 7/12* (2006.01)

(52) U.S. Cl. ....................... 297/471; 297/216.1; 188/371

(58) Field of Classification Search .................. 188/371; 280/805; 297/470, 471, 472, 216.1
See application file for complete search history.

(56) References Cited

U.S. PATENT DOCUMENTS

| | | | | |
|---|---|---|---|---|
| 3,087,584 A * | 4/1963 | Jackson et al. ................. | 188/372 |
| 3,968,863 A | 7/1976 | Reilly | |
| 4,027,905 A * | 6/1977 | Shimogawa et al. ......... | 297/472 |
| 5,487,562 A * | 1/1996 | Hedderly et al. ............. | 280/777 |
| 5,664,807 A * | 9/1997 | Bohmler ........................ | 280/805 |
| 6,183,014 B1 * | 2/2001 | Kruger .......................... | 280/805 |
| 6,394,393 B1 | 5/2002 | Mort | |
| 6,769,715 B2 * | 8/2004 | Riefe et al. .................... | 280/777 |
| 7,445,181 B2 * | 11/2008 | Knoll et al. ............... | 244/122 R |
| 7,784,874 B2 * | 8/2010 | Murphy et al. ............... | 297/472 |
| 2008/0015753 A1 | 1/2008 | Wereley | |

FOREIGN PATENT DOCUMENTS

| | | |
|---|---|---|
| GB | 1510607 | 9/1976 |
| GB | 2452589 | 3/2009 |
| WO | WO2009/030937 | 3/2009 |

* cited by examiner

*Primary Examiner* — Milton Nelson, Jr.
(74) *Attorney, Agent, or Firm* — Berliner & Associates

(57) ABSTRACT

An energy absorption apparatus for protecting occupants of different body weights from the effects of excessive G-force by absorbing energy imparted on a vehicle during an explosion occurring below the vehicle. The apparatus has a first mounting member attached to the vehicle, a second mounting member attached to the occupant's seat, and an absorption mechanism attached between the first and second mounting members. The absorption mechanism utilizes an attenuation strip provided on one of the mounting members, and anvils provided on the other of the mounting members such that when the vehicle is subjected to excessive G-force, the attenuation strip is bent and pulled through the anvils thereby producing a frictional attenuation force which controls movement of the seat relative to the vehicle. An absorption adjustment mechanism is provided. Methods of protecting a vehicle occupant from the effects of excessive G-force are also provided.

18 Claims, 9 Drawing Sheets

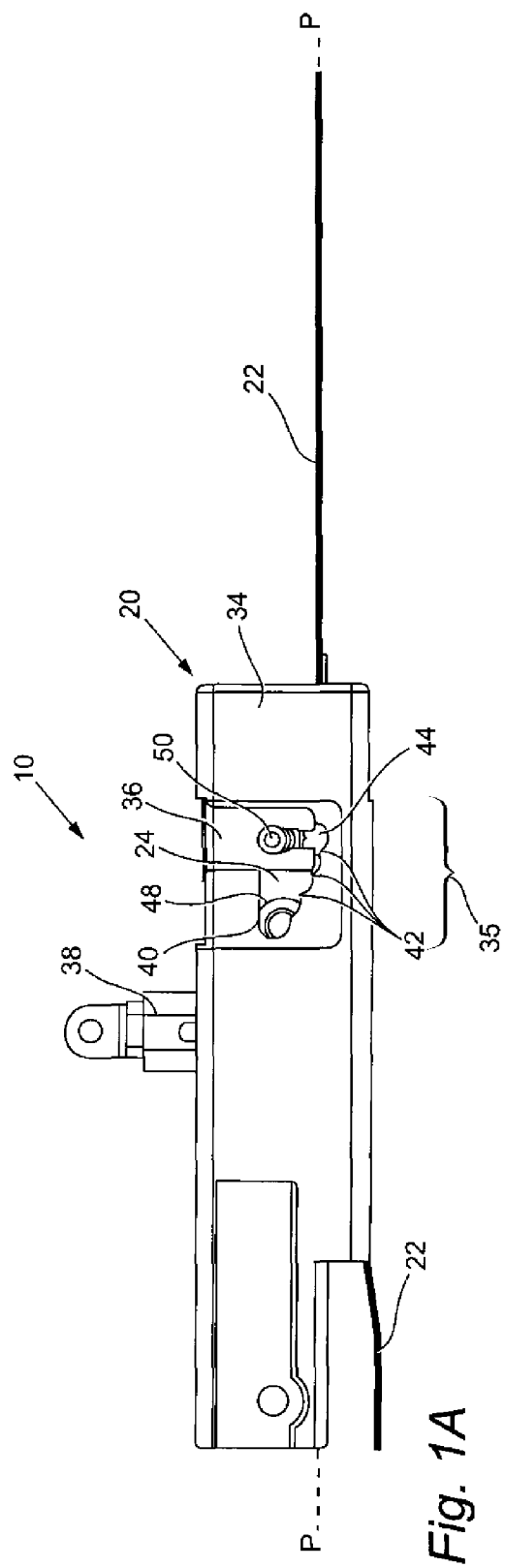
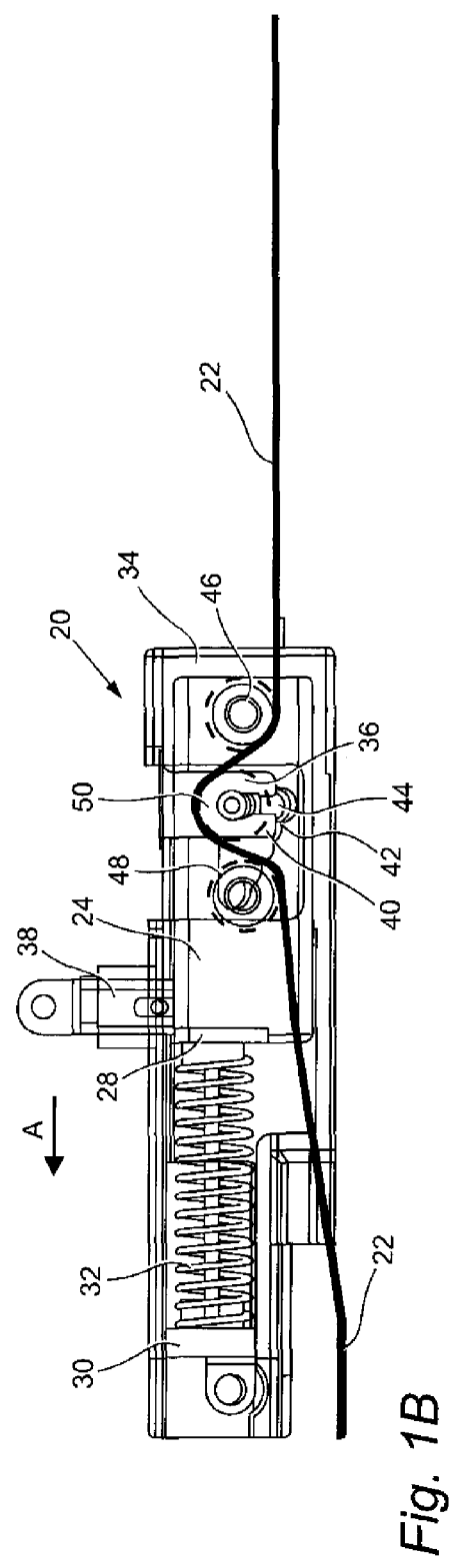
Fig. 1A
Fig. 1B

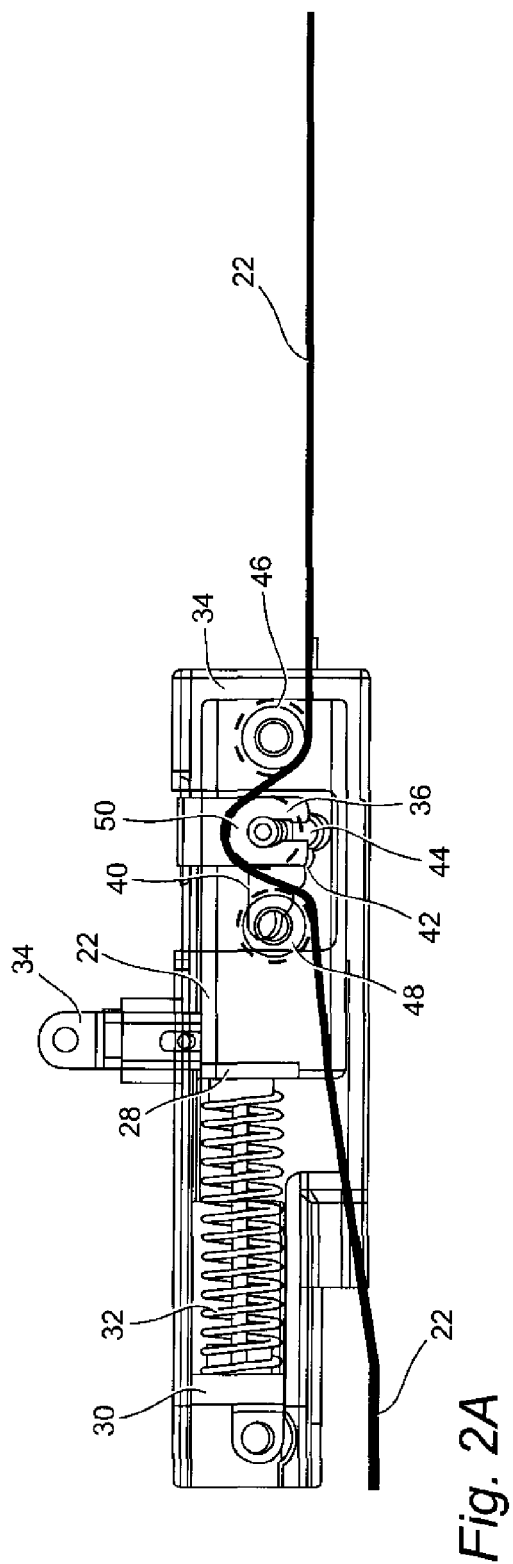
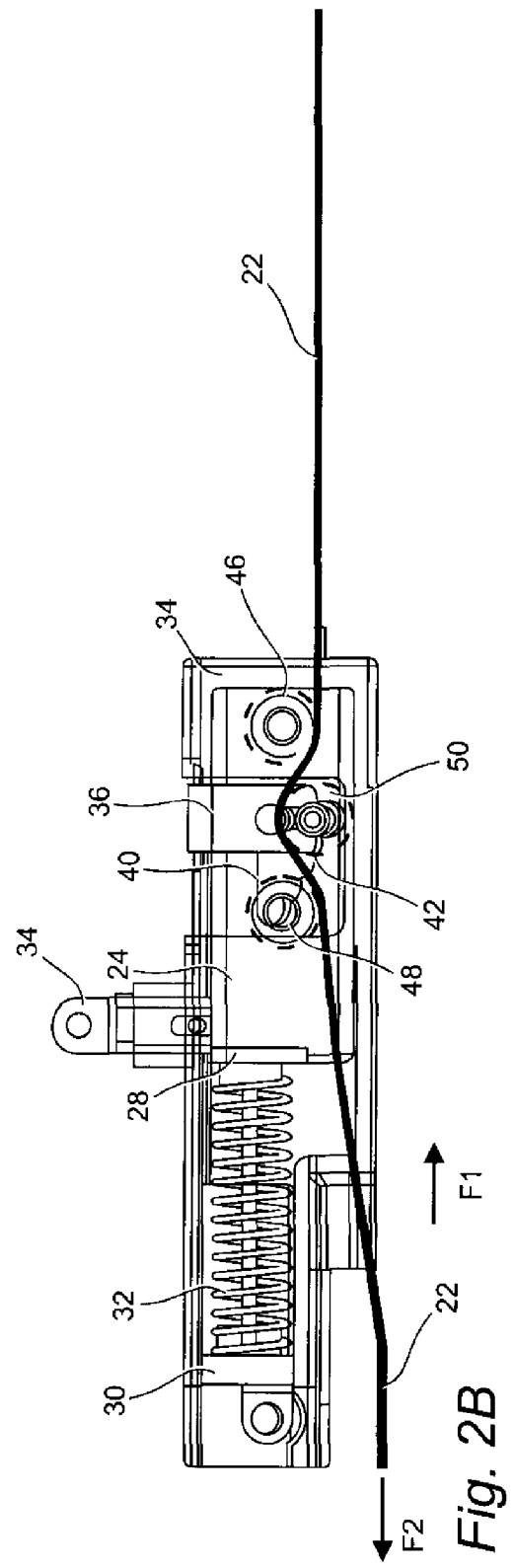
Fig. 2A
Fig. 2B

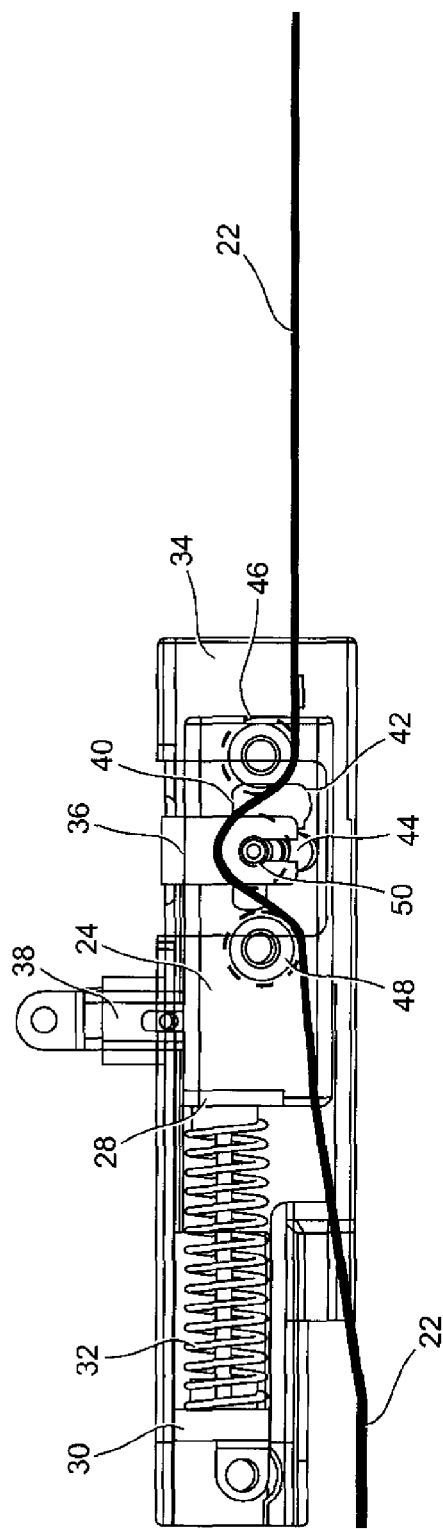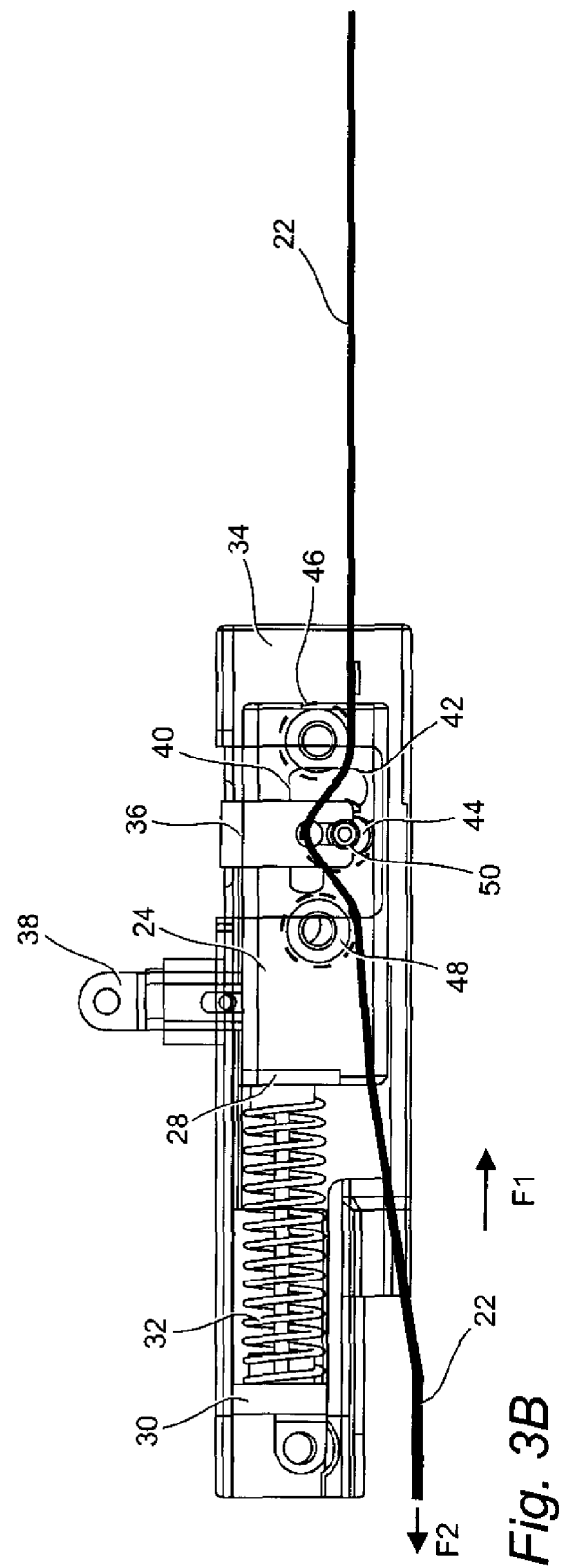
Fig. 3A
Fig. 3B

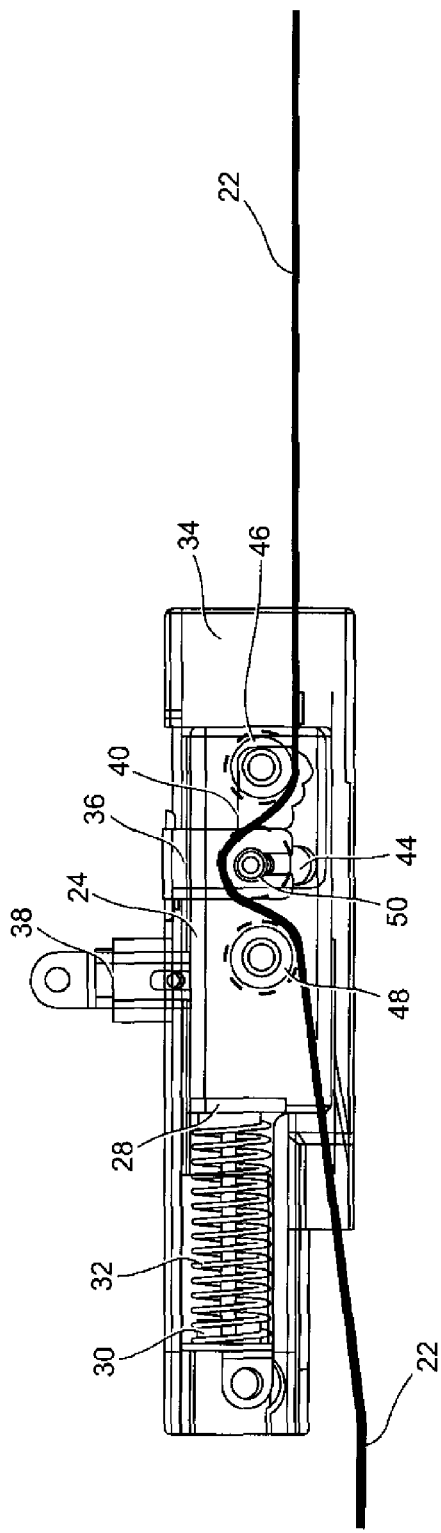
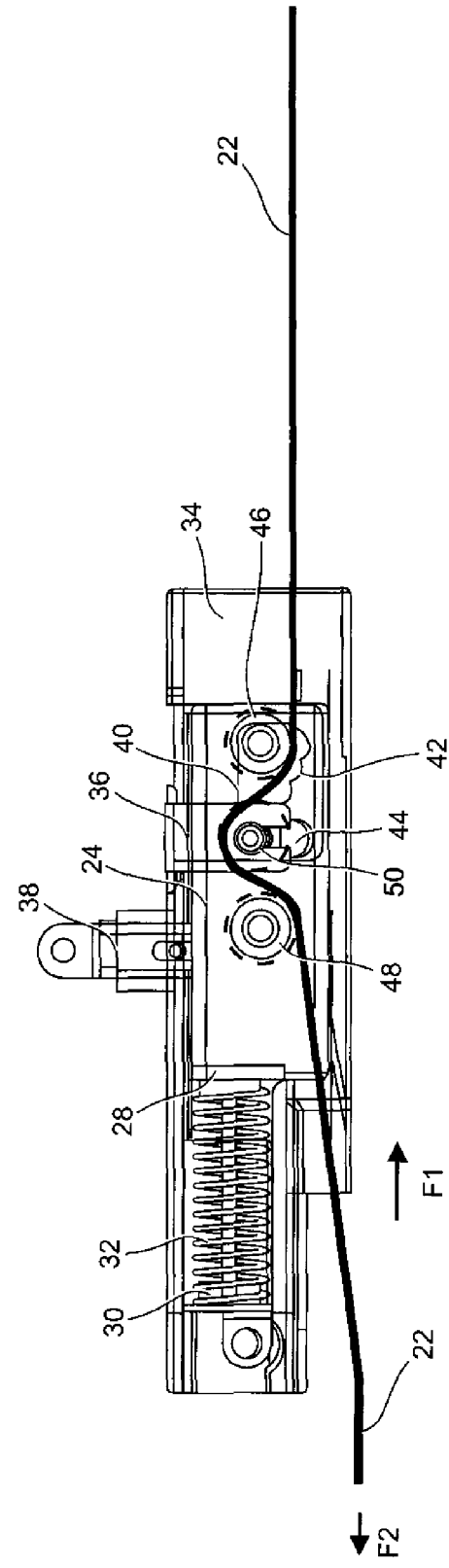
Fig. 4A
Fig. 4B

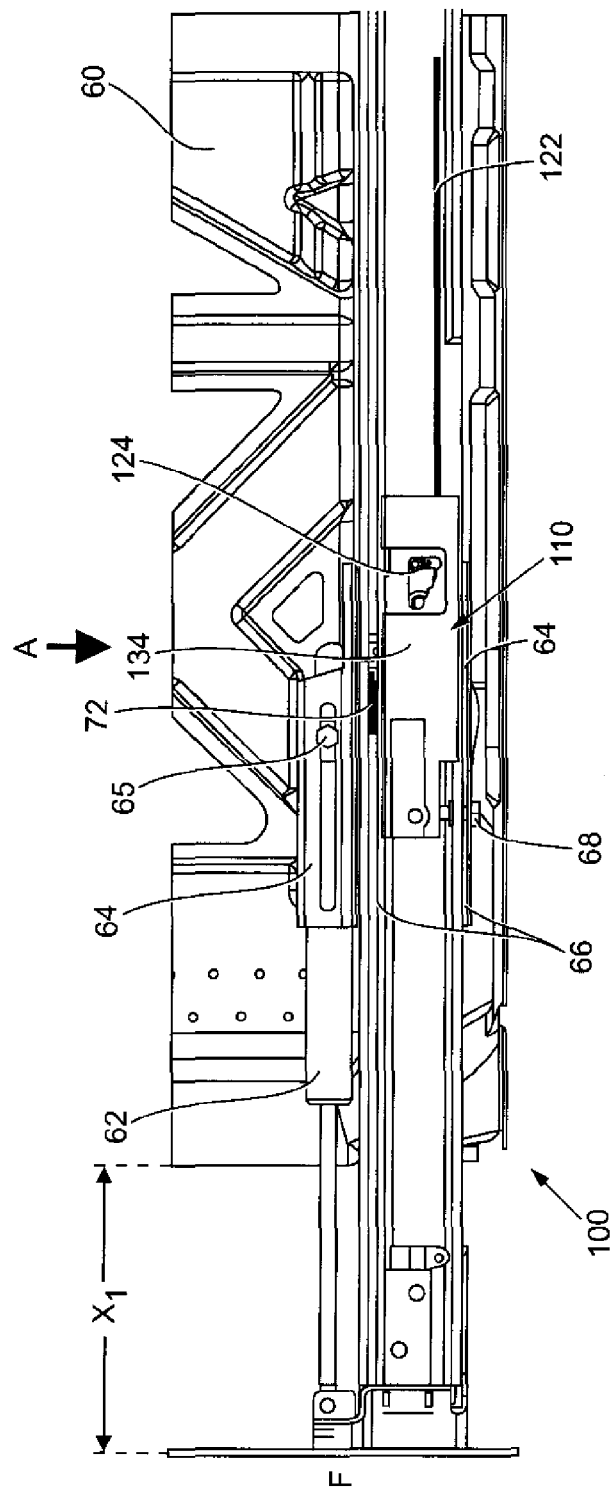
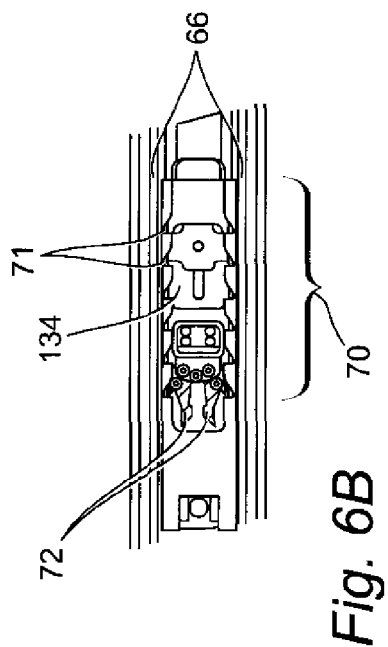
Fig. 6A
Fig. 6B

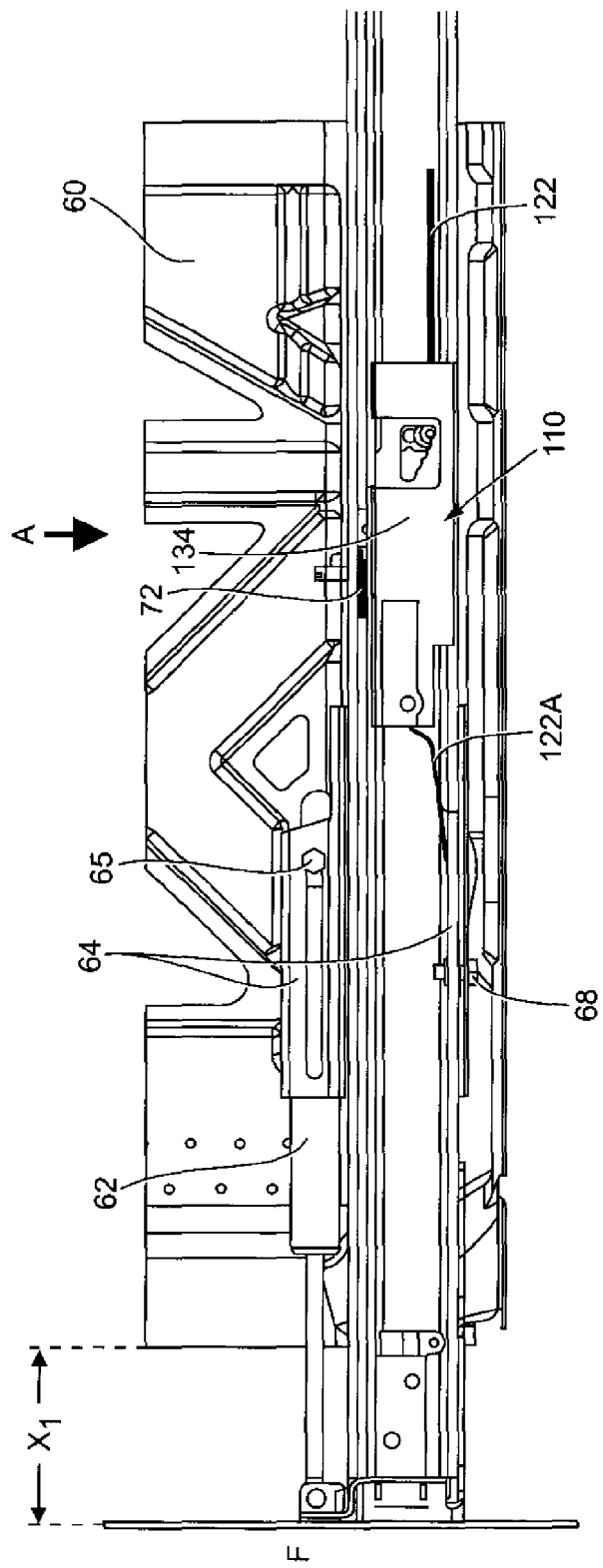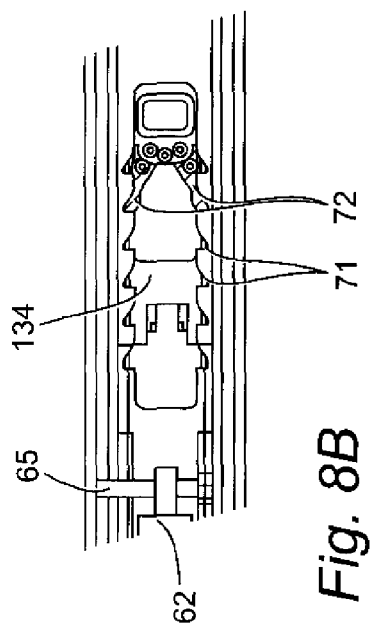

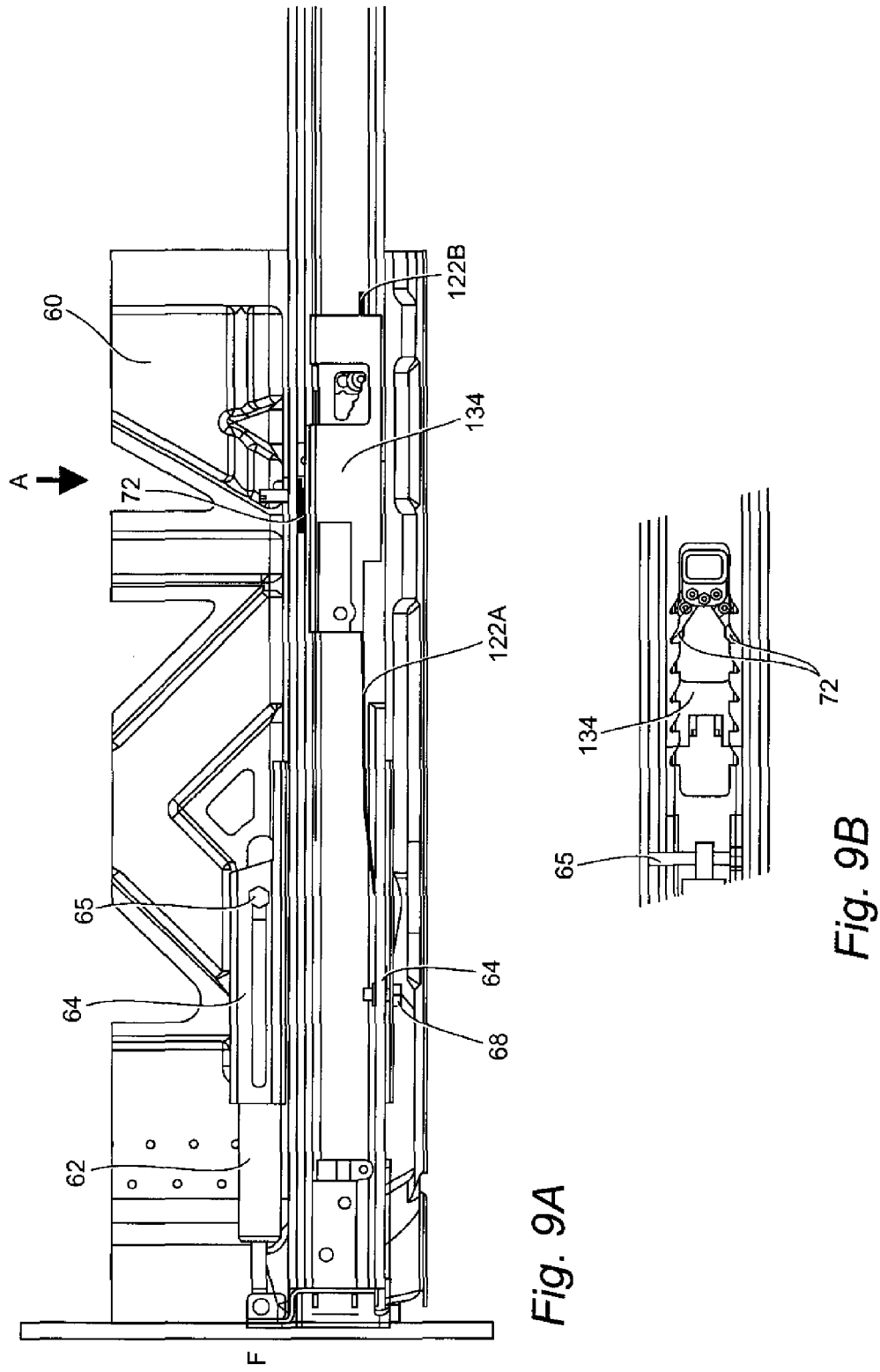

ENERGY ABSORPTION APPARATUS

The present invention relates to energy absorption apparatus, particularly energy absorption apparatus for protecting occupants of different body weights from the effects of excessive G-force by absorbing energy imparted on a vehicle, during an explosion occurring below the vehicle, by a magnitude which is optimised for the weight of occupant. The invention also provides a reset function which allows the apparatus to absorb a first G-force imparted on the vehicle and then absorb a second G-force imparted on the vehicle whilst minimising the space required below the occupant's seat for such absorption.

In hostile environments there is a possibility of vehicles being driven over or attacked by explosive devices below the vehicle. If this happens the explosive device will normally explode which can pose a serious danger to the vehicle occupant(s).

In order to minimise the danger to an occupant from such explosions there are five key problems which must be addressed as follows:—
1) Pressure wave. The pressure wave produced by the explosion affects everything in the path of the explosion and cannot be avoided, although the structure of the vehicle can help to minimise the exposure of the occupant to the pressure wave;
2) Blast effect. This includes the smoke and flames caused by the explosion and can be deflected away from the occupant using deflection technology (for example, an appropriately shaped underside of the vehicle chassis);
3) Shrapnel. Typically, shrapnel is emitted by the explosion, or in direct consequence of the explosion. Appropriate armouring can be used to protect the occupant from shrapnel.
4) Explosion Induced G-force. The explosion will cause the vehicle to accelerate away from the source of the explosion very rapidly. If the explosion occurs below the vehicle, the main component of acceleration will be upward. This causes the vehicle occupant to be subjected to a corresponding upward force which is perceived by the occupant as a tremendous G-force into the seat.
5) Slamdown G-force. As the vehicle is propelled away from the source of the blast, it will gradually begin to decelerate as it reaches its peak of upward displacement. Eventually weightlessness will be perceived by the occupant as the direction of movement is changed from upward to downward. The vehicle will then begin to accelerate towards the ground under the action of gravity and will eventually hit the ground with a tremendous impact. As the vehicle impacts the ground the occupant will therefore be subjected to a "slamdown" G-force which, if not absorbed, will cause injury.

Even if each of factors 1 to 3 are survivable, there will be fatal consequences for the occupant if the level of G-force experienced by the occupant is too great in either of factors 4 or 5.

One way of reducing the G-force experienced by the occupant in an explosion or blast event is to provide a seat mounted force attenuation arrangement in the form of a deformable metal strip which is woven through a series of anvils and which will deform when pulled through the anvils thereby introducing a frictional attenuation force which attenuates the G-force which would otherwise be experienced by the seat occupant. One such system is described in International Patent Publication No. WO2009/030937.

However, such systems are not able to provide an optimised level of attenuation for a given weight of occupant, nor do they provide the most efficient use of space available below the seat.

According to a first aspect of the present invention there is provided energy absorption apparatus for protecting occupants of different body weights from the effects of excessive G-force by absorbing energy imparted on a vehicle during an explosion occurring below the vehicle, the energy absorption apparatus comprising:—
  a first mounting member attached to the vehicle;
  a second mounting member attached to the occupant's seat;
  an absorption mechanism attached between the first and second mounting members, the absorption mechanism comprising at least an attenuation strip provided on one of the mounting members, and anvils provided on the other of the mounting members, and wherein the attenuation strip is woven between the anvils such that when the vehicle is subjected to excessive G-force, the attenuation strip is bent and pulled through the anvils thereby producing a frictional attenuation force which controls movement of the seat relative to the vehicle and wherein an absorption adjustment mechanism is provided, the absorption adjustment mechanism being capable of adjusting the magnitude of attenuation by adjusting the frictional attenuation force created as a result of the action of the attenuation strip being bent and pulled through the anvils, depending upon the weight of the occupant such that a substantially similar length of attenuation strip is bent and pulled through the anvils, for a given G-force, regardless of the weight of the occupant.

According to the first aspect of the present invention there is also provided a method of protecting a vehicle occupant from explosion induced G-forces, the method comprising:—
  providing a first mounting member attached to the vehicle;
  providing a second mounting member attached to the occupant's seat;
  providing an absorption mechanism between the first and second mounting members, wherein the absorption mechanism comprises an attenuation strip provided on one of the mounting members and an anvil provided on the other of the mounting members such that when the vehicle, and hence the first mounting member, is subjected to an explosion induced G-force, the attenuation strip is bent and pulled over the anvil in order to absorb a portion of the G-force which would otherwise be imparted on the occupant; and
  controlling the movement of the seat relative to the vehicle by adjusting the frictional attenuation force by way of an absorption adjustment mechanism which increases the magnitude of attenuation by increasing the frictional attenuation force created as a result of the action of the attenuation strip being bent and pulled through the anvils, as the weight of the occupant is increased such that a substantially similar length of attenuation strip is bent and pulled through the anvils for a given G-force regardless of the occupant's weight.

Since the apparatus of the present invention uses substantially the same length of attenuation strip for a given G-force, regardless of the combined weight of the seat and occupant (including armour, backpacks etc.), the maximum amount of attenuation possible is always provided and hence the prospects of the occupant surviving the effects of the explosion induced G-force significantly increases.

According to a second aspect of the present invention there is provided energy absorption apparatus for protecting occupants from the effects of excessive G-force, by absorbing energy imparted on a vehicle during an explosion occurring below the vehicle, the energy absorption apparatus comprising:— a first mounting member fixed to the vehicle;
a second mounting member fixed to the occupant's seat;
an absorption mechanism provided between the first and second mounting members such that when the vehicle is subjected to a first excessive G-force, the second mounting member will stroke from its initial position along the first mounting member in a first absorption stroke,
a reset mechanism for returning the second mounting member to an intermediate position after the first excessive G-force has passed, the intermediate position being at least partially along the stroke distance traveled by the second mounting member during the first absorption stroke; and
locking means for locking the second mounting member with respect to the first mounting member in said intermediate position such that when the vehicle is subjected to a second excessive G-force the second mounting member will stroke from its intermediate position along the first mounting member in a second absorption stroke.

According to the second aspect of the present invention there is also provided a method of protecting a vehicle occupant from the effects of excessive G-force, by absorbing energy imparted on a vehicle during an explosion occurring below the vehicle, the method comprising:— providing a first mounting member fixed to the vehicle;
providing a second mounting member fixed to the occupant's seat;
providing an absorption mechanism between the first and second mounting members;
absorbing a portion of a first excessive G-force by allowing the second mounting member to stroke from its initial position along the first mounting member in a first absorption stroke,
returning the second mounting member to an intermediate position after the first excessive G-force has passed, the intermediate position being at least partially along the stroke distance traveled by the second mounting member during the first absorption stroke;
locking the second mounting member with respect to the first mounting member in said intermediate position;
absorbing a portion of a second excessive G-force by allowing the second member to stroke from said intermediate position along the first mounting member in a second absorption stroke.

This allows the energy absorption apparatus to absorb a greater overall load for a given amount of space below the seat.

Further features and advantages of the invention will become apparent from the following description and the claims.

Embodiments of the invention will now be described, by way of example only, with reference to the drawings, in which:—

FIG. 1A is a side view of the energy absorption apparatus according to the first aspect of the present invention; for clarity the apparatus is shown isolated from the seat components in a pre-adjusted configuration;

FIG. 1B is a further illustration of the apparatus of FIG. 1, where the outer casing is transparent in order to better illustrate the internal components of the energy absorption apparatus;

FIG. 2A is a side view of the energy absorption apparatus of FIG. 1B which has been adjusted for a light weight occupant such that the apparatus is in a weight adjusted configuration;

FIG. 2B is a side view of the energy absorption apparatus of FIG. 2A where the apparatus is in an active attenuating configuration;

FIG. 3A is a side view of the energy absorption apparatus of FIG. 1B which has been adjusted for a medium weight occupant such that the apparatus is in a weight adjusted configuration;

FIG. 3B is a side view of the energy absorption apparatus of FIG. 3A where the apparatus is in an active attenuating configuration;

FIG. 4A is a side view of the energy absorption apparatus of FIG. 1B which has been adjusted for a heavy weight occupant such that the apparatus is in a weight adjusted configuration;

FIG. 4B is a side view of the energy absorption apparatus of FIG. 4A where the apparatus is in an active attenuating configuration;

FIG. 6A is a cross sectional side view of an energy absorption apparatus according to a second aspect of the present invention where a reset mechanism is illustrated prior to being subjected to an excessive G-force;

FIG. 6B is a cross sectional view taken along arrow A of FIG. 6A;

FIG. 8A is a cross sectional side view of the apparatus in an intermediate configuration after being subjected to a first G-force but before being subjected to a second excessive G-force;

FIG. 8B is a cross sectional view taken along arrow A of FIG. 8A;

FIG. 9A is a cross sectional side view of the apparatus where the reset mechanism is shown at the end of a second absorption stroke after being subjected to the second excessive G-force; and FIG. 9B is a cross sectional view taken along arrow A of FIG. 9A.

Figure 5:
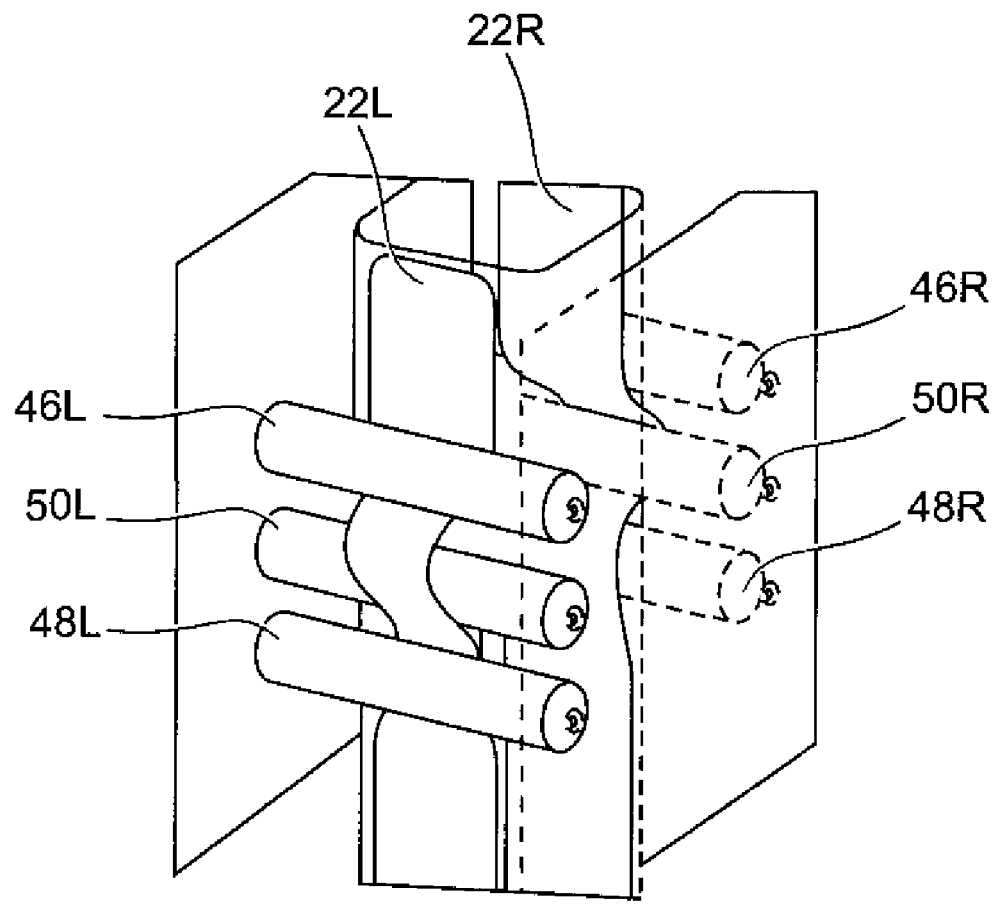
FIG. 5 is an illustrative representation of the interaction between the anvils and attenuating strip of the invention where a pair of the energy absorption apparatus are shown side-by-side.

It is commonly known in the industry to use the term "$50^{th}$ percentile" to refer to a $50^{th}$ percentile male as specified in the NATO document AEP-55 and which represents the average male of the (United States) population between the 1970's and the 1980's (78 kg), and the terms "$5^{th}$ percentile" and "$95^{th}$ percentile" are to be construed accordingly. For brevity, $50^{th}$ percentile is referred to in the following description as a "medium weight occupant", $5^{th}$ percentile as a "light weight" occupant and $95^{th}$ percentile as a "heavy weight" occupant.

In the following description and the claims, the plane of attenuation strip movement is defined as the plane in which the overall direction of movement of the strip lies during attenuation, which is substantially the same general plane in which the direction of seat movement, relative to the vehicle during a blast event, lies. The plane of attenuation strip movement is designated P-P in FIG. 1A. Furthermore, the term "excessive G-force" shall be taken to mean any G-force capable of injuring a seat occupant if it were not at least partially absorbed.

With reference to FIGS. 1A to 5, energy absorption apparatus 10 according to a first aspect of the present invention is provided between a first mounting member, such as a relatively rigid mounting on the vehicle chassis (not shown), and a second mounting member, such as a seat leg (not shown). Guide bearings and a guide track arrangement may also be provided between the seat and the vehicle in order to further guide movement of the seat with respect to the vehicle during attenuation.

As shown most clearly in FIG. 1B, a weight adjustable energy absorption cartridge 20 is mated with an attenuation strip 22 that is anchored to the seat at one end thereof (the left hand side of FIGS. 1 to 4). The cartridge 20 has an outer control casing 34 and an inner anvil housing 24. The outer control casing 34 of the cartridge 20 has a recessed area 35 for receiving a retainer, such as a retaining clip 36. The cartridge 20 is retained within the leg structure of the vehicle seat. An absorption adjustment mechanism is provided by an inner anvil housing 24 which is surrounded by the control casing 34 and which has an attenuation control aperture 40 on both sides of the cartridge 20. The inner anvil housing 24 and the attenuation strip 22 are moveable longitudinally within the outer casing 34. Upper compression plate 28 is fixed to the bottom of the inner anvil housing 24 and lower compression plate 30 is fixed within the outer control casing 34. The compression plates 28 and 30 are provided at either end of resilient means, which may be a coiled spring 32 (or other means such as a resilient elastomeric block having suitable compression and expansion characteristics, or e.g. a telescopic strut containing a force dampening fluid). The retaining clip 36 resides within the recessed area 35 and can slide there along with the inner anvil housing 24.

The attenuation strip 22 is selected during manufacture to be of a constant material and dimension which requires an appropriate amount of force to be exerted upon it in order to bend it around the anvils as discussed subsequently. The attenuation strip 22 may also have a reduced width region, as described in detail in International Patent Publication No. WO 2009/030937 A2, the relevant contents of which are hereby incorporated by reference. This reduced width region in the attenuation strip 22 is desirable because the initial force necessary to set the seat in motion is greater than the force necessary to maintain its movement. Therefore, this provides a relatively low level of resistance against movement of the seat at the point in the seat stroke where the force required to move the seat is at its greatest (i.e. at the start of the seat stroke).

The inner anvil housing 24 has a transverse slot 44 which allows the centre anvil 50 to move perpendicular to the plane of attenuation strip P-P until it abuts against one of a series of notches 42 along one edge of the attenuation control aperture 40. It will be appreciated that any number of notches can be provided along the attenuation control aperture 40 to provide an infinite variation in weight and adjustability. Indeed the notches could be replaced by a sloped, flat surface which, upon impact of the central anvil 50 during attenuation, is adapted to hold the central anvil there at. The series of notches 42 are arranged such that their perpendicular distance from the plane of movement of the attenuation strip P-P incrementally increases from one end of the attenuation control aperture (the right hand side of the Figures) to the other. The purpose of this incremental increase will be dealt with in more detail subsequently.

The inner anvil housing 24 is also provided with a series of detents (not shown) on one wall corresponding to the number and position of notches 42 of the attenuation control aperture 40. The detents co-operate with a projection (not shown) on the underside of an inwardly biased locking block 38 to selectively lock the inner anvil housing 24 against longitudinal movement within the outer casing 34.

The inner anvil housing 24 (best illustrated in FIGS. 1B, 2B, 3B and 4B) secures both a first anvil 46 and a third anvil 48 at fixed perpendicular positions relative to the plane of the attenuation strip P-P. The first and third anvils 46, 48 are therefore aligned with one another and cannot move perpendicularly toward or away from the attenuation strip 22. A second, central anvil 50 is also retained against longitudinal movement toward or away from the first and third anvils 46, 48 by the transverse slot 44 of the inner housing 24; however, the central anvil 50 would be able to move perpendicularly toward and away from the attenuation strip 22 along transverse slot 44 if it were not secured during normal use from movement toward the plane of the attenuation strip P-P by the retaining clip 36. In other words, the central anvil 50 cannot move along the transverse slot 44 during normal use due to the retaining clip 36; however, the prongs of the retaining clip 36 are designed to deform at a predetermined load to release the central anvil 50 such that it can move along the transverse slot 44 during attenuation. In this regard, the position and length of transverse slot 44 relative to the first and third anvils 46, 48 is such that when the second, central anvil 50 is at one end (when the central anvil 50 is furthest away from the plane P-P) of the slot 44 its pivot axis is in line with those of the first and second anvils 46, 48 (FIG. 4B) and when the second, central anvil 50 is at the other end (when the central anvil 50 is nearest to the plane P-P) of the slot 44 its pivot axis is out of alignment with those of the first and second anvils 46, 48 to the greatest extent (FIG. 2B). Of course, the length of the slot could be increased if desired such that the central anvil 50 can move even further into and out of alignment with the first and third anvils 46, 48 to cause even more bending of the strip 22.

As shown in FIG. 5, a pair of energy absorption mechanisms may be provided side by side on a seat back in order to improve the response characteristics and packaging requirements of the system.

With reference to FIG. 1B, during initial set-up of the apparatus, the attenuation strip 22 is woven under the first anvil 46, over the second, central anvil 50 and under the third anvil 48 in such a way that the attenuation strip 22 is bent around the second, central anvil 50 to its fullest extent (the amount by which the strip 22 would need to be bent for the heaviest occupant). In the embodiment shown, the anvils 46, 48, 50 are cylindrical members which are rotatably mounted on their respective axes in order to provide rollers over which the attenuation strip 22 may pass during a blast event.

The upper compression plate 28 abuts against the bottom of the inner anvil housing 24 such that any weight put upon the seat will be transferred via the inner anvil housing 24 to the upper compression plate 28 and thereby compress the coiled spring 32 against the lower compression plate 30 which is fixed to the outer control casing 34.

In use, when the vehicle in which the apparatus is installed is being operated in normal conditions (i.e. when no force attenuation is required) no active bending of the attenuation strip 22 occurs. The occupant seat is therefore held in a relatively fixed position with respect to the vehicle. The connection between the seat and the vehicle is not completely rigid due to a gas strut (not shown) upon which the outer control casing 34 rests, to allow for height adjustment and reset (discussed subsequently).

During normal use, the combined weight of the occupant and seat is suspended by the attenuation strip 22 being woven between the anvils 46, 48, 50. In this configuration, the attenuating force that the seat will provide in a blast event will have been simply and automatically pre-adjusted to suit the occupant weight as will now be described.

When an occupant of a given weight sits on the seat, the load is transferred by the inner anvil housing 24 to the upper compression plate 28 which will compress the spring 32 against the lower compression plate 30, thereby allowing the inner anvil housing 24 to move downward within the outer control casing 34 in the direction indicated by arrow A in FIG. 1B. The amount by which the spring 32 is compressed, and hence the resulting position of the inner anvil housing 24 with respect to the outer control casing 34, depends upon the combined weight of the seat and occupant. As the inner anvil housing 24 moves in the direction A, the second, central anvil 50 will, since it is retained from longitudinal movement relative to the inner anvil housing 24 by transverse slot 44 and from perpendicular movement relative to the attenuation strip 22 by the retaining clip 36, align itself perpendicularly opposite one of the incremental notches 42 of the attenuation control aperture 40. In this position the apparatus is therefore set in a pre-excessive G-force, weight adjusted position. The apparatus can be locked in this position by allowing the block 38 to engage with detents of the inner anvil housing 24. As shown in FIG. 2A, at this point the second, central anvil 50 and the portion of the attenuation strip 22 which passes over the central anvil 50 still remain perpendicularly displaced from the plane of attenuation strip movement P-P by the maximum extent possible due to the retaining clip 36. However, the second, central anvil 50 will only be held in this weight adjusted position during normal use. When an excessive G-force is applied, because the second, central anvil 50 will always be opposite a notch 42 which is appropriately spaced from the plane of attenuation strip movement P-P for that occupant's weight, and because it is only held there by the retaining clip 36, upon attenuation under the excessive G-force, the optimal degree of frictional attenuation force will be applied as described subsequently.

If an occupant of different weight from the previous occupant sits on the seat the weight adjusted position can be automatically readjusted by disengaging block 38 from the detents of the inner anvil housing 24. This allows the compressed spring 32 to again compress or expand by an amount which corresponds to the weight of the occupant. The block 38 is then allowed to reengage with the appropriate detents to thereby lock the seat in the new weight adjusted position. Engagement of the block 38 can be controlled by a lever/cable arrangement connected thereto and which can be located at an appropriate position on the seat.

In the event of an explosion below the vehicle, the vehicle and the seat support will be accelerated upwards with an explosion induced G-force depicted by arrow F1 in FIGS. 2B, 3B and 4B. The explosion induced G-force is transferred into the cartridge 20 by means of the attenuation strip 22. In this regard, the static inertia of the seat results in the effective dynamics of the system being equivalent to pulling the strip 22 in the direction F2 shown in FIGS. 2B, 3B and 4B. In view of the tendency of the attenuation strip 22 to straighten out along the plane P-P, when the force acting upon the attenuation strip 22 is greater than the retention load of retaining clip 36, retaining clip 36 will release the central anvil 50 and the attenuation strip 22 will thrust the central anvil 50 along transverse slot 44 towards the plane of strip movement P-P until it abuts the "active notch" 42 in the attenuation control aperture 40. If the force acting upon the attenuation strip 22 is then greater than the frictional attenuation force provided by the attenuation strip and anvil arrangement (which is now set relative to the occupant weight) the attenuation strip 22 will be drawn through the anvils 46, 48 and 50.

Throughout attenuated movement of the attenuation strip 22, the central anvil 50 is held in an active attenuating position away from the plane P-P by the distance permitted by the active notch 42. Since the notch height of the attenuation control aperture 40 decreases along the length of the attenuation control aperture 40, the further along the attenuation control aperture 40 the second, central anvil 50 resides when in the (pre-excessive G-force) weight adjusted position, the less the perpendicular displacement of the second, central anvil 50 from the plane P-P will be in the active attenuating position. In this regard, FIG. 4B. illustrates the active attenuating position of the central anvil 50 where the seat is configured for a heavy weight occupant and hence the second, central anvil 50 perpendicular displacement from the plane P-P is at its minimum and the resulting frictional attenuation force is at its maximum. The pivot axes of the anvils 46, 48 and 50 are aligned with one another in this configuration and therefore the attenuation strip must twice bend through approximately ninety degrees in order to pass through the anvils 46, 48, 50. FIG. 2B illustrates the active attenuating position of the second, central anvil 50 where the seat is configured for a very light occupant and the central anvil 50 perpendicular displacement from the plane P-P is at its maximum and hence the resulting frictional attenuation force is at its minimum. The central anvil 50 is nearer to the plane of attenuation strip P-P than the other two anvils 46, 48 and hence the attenuation strip is only required to twice bend through less than ninety degrees in order to pass through the anvils 46, 48, 50. FIG. 3B illustrates the active attenuating position of the second, central anvil 50 where the seat is configured for a medium weight occupant and the central anvil 50 perpendicular displacement from the plane P-P and hence a medium level of frictional attenuation force is applied.

It will be appreciated that although in the embodiments described, the anvils are moved perpendicularly relative to the plane P-P in order to alter the angles through which the attenuation strip 22 must bend in order pass through the anvils, this is not the only way of achieving this. For example, the anvils 46, 48 could alternatively be moved parallel or perpendicular to the plane P-P. In this regard, although in the embodiment shown, only the second, central anvil 50 is held perpendicular to the plane of attenuation strip travel P-P during attenuation, a similar effect could be created by holding the first anvil 46 and third anvil 48 perpendicular to the plane of attenuation strip travel P-P during attenuation.

The result of the change in frictional attenuation force dependent upon occupant weight is that, for a given G-force, substantially the same length of attenuation strip 22 will be drawn through the anvils 46, 48, 50, regardless of the combined weight of the seat and occupant. This means that the optimal amount of attenuation is provided for all occupant weights without the risk of applying too much attenuation for a lighter occupant or too little attenuation for a heavier occupant. This is particularly useful in the fast-paced, hostile environment in which the system is designed to operate because there is often very little time for the occupant to adjust the seat upon entry to the vehicle. Furthermore, if the system was not automatic, even if the occupant were to attempt to adjust the seat they are unlikely to know which weight to calibrate the seat for since this would require instantaneously knowing their combined weight including backpacks, armour, weapons etc.

The retaining clip 36 retains the central anvil 50 during normal use and automatic attenuation adjustment for even a heavy weight occupant (and is also designed to survive up to 7G bump loading with a heavy weight occupant in the seat); however, the retention strength of the clip 36 is designed such that its forks will deform and release the central anvil 50 from the weight adjusted position at the onset of a blast event such that it does not hinder movement of the second, central anvil 50 toward the active attenuating position.

After the initial blast, the energy imparted on the seat will eventually begin to decrease towards the end of the explosion event and/or as the vehicle is propelled away from the source of the blast. Eventually the energy will decrease to an amount which is not sufficient to continue bending the attenuation strip 22 between the anvils 46, 48, 50, at which point attenuated movement of the seat will cease. However, the length of the attenuation strip 22 is deliberately selected such that for all weights, a significant length of unused attenuation strip 22 (i.e. strip which has not passed through the anvil arrangement) remains after the initial blast event. This contrasts with known systems where increased occupant weight risks exhaustion of the attenuation strip length and hence bottoming out. As the vehicle falls under the action of gravity, after the blast has subsided, it will eventually hit the ground with a considerable impact. When the vehicle impacts the ground it is subjected to a second "slamdown" G-force which itself could injure the occupant; however, the length of strip 22 which remains unused after the initial blast event provides a further energy absorption ability which gives protection from these slamdown G-forces by attenuation thereof, in the same way as previously described.

The cartridge arrangement of the invention provides a simple component which can be quickly and easily removed and replaced into a variety of systems as required. It can also therefore be replaced periodically e.g. at regular service intervals with relative ease.

With reference to FIGS. 6A to 9B energy absorption apparatus according to a second aspect of the present invention will now be described. In order to minimise repetition, similar features of the apparatus described subsequently have been numbered with a common two-digit reference numeral and have been differentiated by a third digit placed before the two common digits. Such features are structured similarly, operate similarly, and/or have similar functions as previously described unless otherwise indicated.

With reference to FIGS. 6A and 6B, energy absorption apparatus is provided with a reset mechanism generally designated 100. The reset mechanism 100 comprises resilient means such as a gas (or other force dampening fluid) strut 62 which is retained within a longitudinal slot of a slide arrangement 64 by a bolt 65 at one end, and which is attached to the bottom of the seat leg. The slide 64 surrounds a cross sectioned seat leg 66.

An energy absorption cartridge 110 having a securing bolt 68 and an attenuation strip 122 as described above, is secured within the seat leg 66 by a ratchet profile 70 provided through a wall of the seat leg 66. As best illustrated by FIGS. 6B, 7B, 8B, 9B, the outer casing 134 of the energy absorption cartridge 110 has a pair of outwardly biased locking fork protrusions 72 which are arranged to selectively engage with corresponding ratchet notches 71 in the ratchet profile 70 thereby providing locking means to selectively lock the energy absorption cartridge 110 to the seat leg 66.

In normal use, prior to a blast event, the reset mechanism 100 and energy absorption cartridge 110 are configured as shown in FIG. 6A. In this configuration, the gas strut 62 has not been compressed and is therefore in an extended configuration, the absorption cartridge 110 is in its initial position and no attenuation, and hence no bending of the attenuation strip, 122 has occurred. The distance between the bottom of the seat 60 and the vehicle floor F (which will become the maximum available first absorption stroke distance) is labelled $X_1$ in FIG. 6A.

Note that the force attenuation eventually provided by the absorption cartridge 110 in the event of an explosion can be adjusted to accommodate for the weight of the seat occupant in the same way as previously described.

Figure 7A:
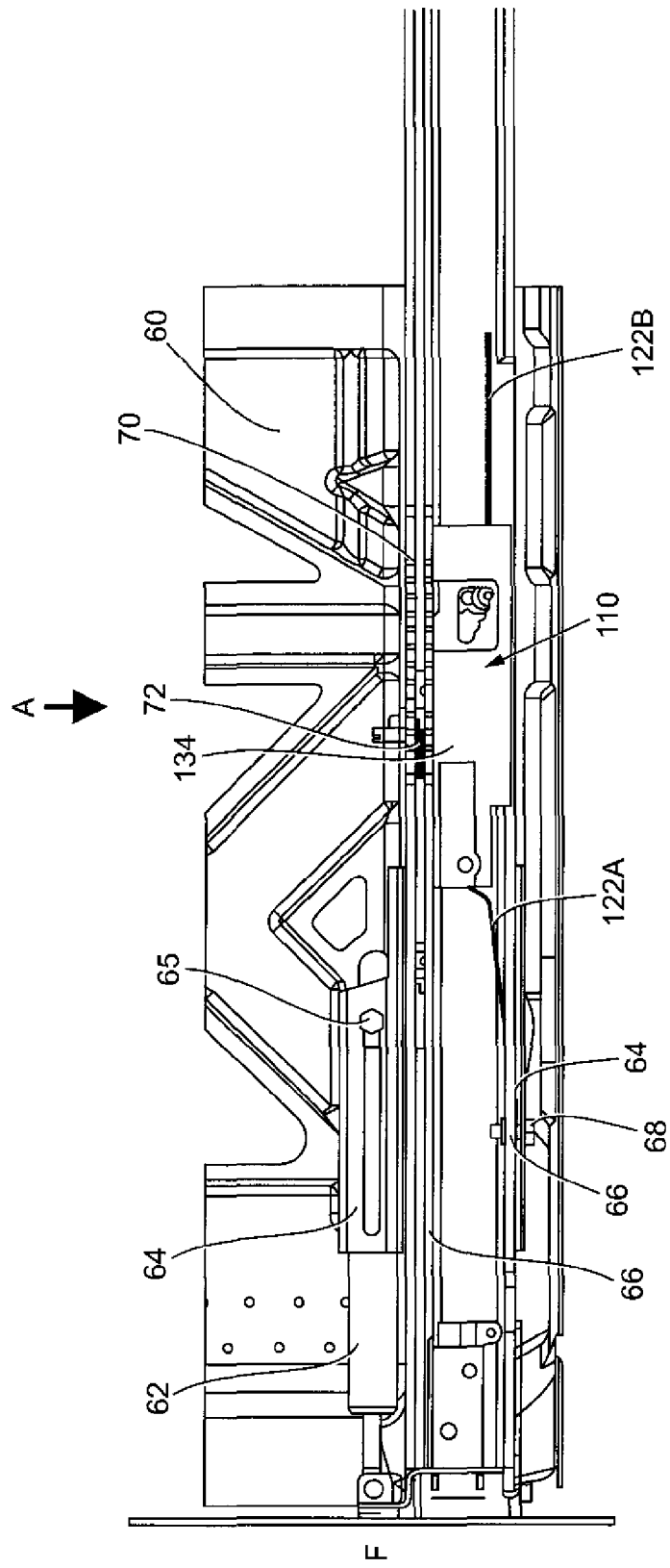
FIG. 7A is a cross sectional side view of the apparatus of FIG. 6A where the reset mechanism is shown at the end of a first absorption stroke after being subjected to a first excessive G-force.
Figure 7B:
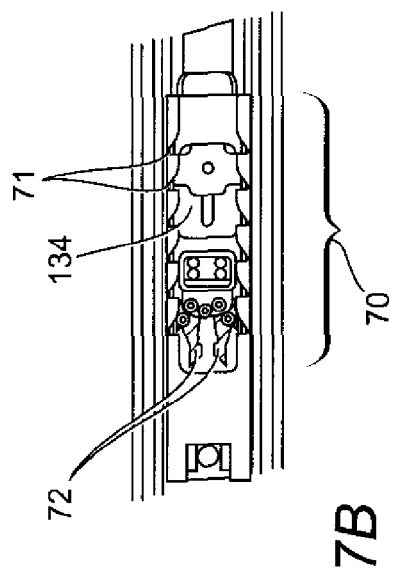
FIG. 7B is a cross sectional view taken along arrow A of FIG. 7A.

With reference to FIGS. 7A and 7B, in the event of an explosion below the vehicle, the vehicle and the seat support will be accelerated upwards with a first, explosion induced, G-force. The explosion induced G-force is transferred into the cartridge 110 by means of the attenuation strip 122 and the cartridge 110 will attenuate the forces on the occupant as previously described such that the seat 60 and slider 64 will have moved downward along its first absorption stoke, $X_1$. In this regard, as the seat 60 moves downward, the uppermost end of the longitudinal slot of the slider 64 abuts against the bolt 65 thereby causing the gas strut 62 to become compressed under the continued stroke of the seat. As can be seen in FIG. 7A, a used strip portion 122A and an unused portion 122B now remains after the first absorption stroke has been completed. It will be appreciated that the described compression of the gas strut 62 transfers some energy from the moving seat and occupant into the gas strut 62.

With reference to FIGS. 8A and 8B, after the first, explosion induced, G-force has been removed, when the blast acceleration forces imparted on the vehicle have subsided (since the vehicle will have reached its peak of upward displacement away from the blast) the compressed gas strut 62 will release the energy previously stored therein by expanding back toward its original length. As the gas strut 62 expands, the bolt 65 abuts against the upper end of the longitudinal slot in the slider 64 which forces the slider 64 and hence the seat 60 connected to it up off the floor F, by a distance labelled $X_2$ in FIG. 8A. Because the attenuation strip 122 is attached to the other side of the slider 64 by bolt 68, the attenuation strip 122, and hence the absorption cartridge 110 through which the strip is woven, will be simultaneously pushed up the inside of the seat leg 66 to an intermediate position illustrated in FIGS. 8A and 8B. As the cartridge 110 is pushed up the inside of the leg 66, the locking fork protrusions 72 are released and spring outwards in order to ratchet up against each notch 71 of the ratchet aperture profile 70. When the gas strut 62 has extended, the absorption cartridge mechanism 110 will reach a corresponding position (the intermediate position) in the leg 66 and the locking fork projections 72 will engage with the next available notch 71 on either side of the ratchet aperture profile 70 as shown in FIG. 8B. This prevents any further movement of the absorption mechanism 110 toward the floor F.

With reference to FIGS. 9A and 9B, when a second excessive G-force (slamdown G-force imparted on the vehicle when it impacts the ground) is applied a further portion of the attenuation strip 122A is attenuated through the absorption cartridge 110 in the same way as previously described. In this regard, since the locking fork projections 72 are firmly engaged within the notches 71 of the ratchet profile, the absorption cartridge cannot move down the seat leg 66 and hence the seat 60 strokes along the distance $X_2$ toward the floor F in a second absorption stroke.

This resetting of the absorption cartridge 110 at a higher position on the seat leg between the time at which the first (explosion induced) G-force subsides and the second (slamdown) G-force is imparted on the vehicle means that the invention provides a greatly improved ability to attenuate forces whilst minimising the amount of space required below the seat. Modifications and improvements may be made to the foregoing, without departing from the scope of the invention, for example:—

The term "occupant" has been used to describe the payload in the seat 16. This is not intended to limit the invention to protecting a person from excessive G-forces, and could, for example, include protecting sensitive electronic equipment from forces which could damage such equipment.

The weight and cost of the apparatus may be reduced with the use of low friction polymers for the load bearing surfaces of the apparatus.

Although the apparatus described has been described with reference to absorbing energy resulting from an explosion, it will be appreciated by the skilled reader that the apparatus could in fact be used to absorb energy from any system in which it is desirable to attenuate the energy of one object relative to another. For example, the energy absorption apparatus could also be used to absorb energy resulting from, for example, a helicopter crash.

The invention claimed is:

1. Energy absorption apparatus for protecting occupants of different body weights from excessive G-force by absorbing energy imparted on a vehicle during an explosion occurring below the vehicle, the energy absorption apparatus comprising:
   a first mounting member attachable to a vehicle;
   a second mounting member attachable to a vehicle seat;
   an absorption mechanism attached between the first and second mounting members, the absorption mechanism comprising at least an attenuation strip provided on one of the mounting members, and anvils provided on the other of the mounting members, and wherein the attenuation strip is woven between the anvils such that when the vehicle is subjected to excessive G-force, the attenuation strip is bent and pulled through the anvils thereby producing a frictional attenuation force which controls movement of the seat relative to the vehicle and wherein an absorption adjustment mechanism is provided, the absorption adjustment mechanism being capable of adjusting the magnitude of attenuation by adjusting the frictional attenuation force created as a result of the action of the attenuation strip being bent and pulled through the anvils, depending upon the weight of the occupant such that a substantially similar length of attenuation strip is bent and pulled through the anvils, for a given G-force, regardless of the weight of the occupant.

2. Apparatus according to claim 1, wherein the or each anvil comprises a rotatably mounted cylindrical roller.

3. Apparatus according to claim 1, wherein a locking mechanism is provided which selectively maintains the absorption mechanism in the pre-excessive G-force weight adjusted position when the weight of the occupant is removed from the apparatus.

4. Apparatus according to any claim 1, wherein slamdown energy absorption means is also provided in order to attenuate any further G-forces exerted on the vehicle as the vehicle impacts the ground.

5. Apparatus according to claim 4, wherein the slamdown energy absorption means comprises at least one of a coiled spring member, a telescopic strut and an unused length of the attenuation strip.

6. Apparatus according to claim 1, wherein the anvils and attenuation strip are arranged such that, when the apparatus is subjected to the weight of the occupant, at least one of the anvils is automatically actuated to pre-excessive G-force, weight adjusted position which upon activation will retain the anvil in an active attenuating position which results in the angle through which the attenuation strip must bend when passing through the anvils being such that the frictional attenuation force resulting from the attenuation strip being pulled through the anvils is of a magnitude which is optimised to that occupant's weight.

7. Apparatus according to claim 6, wherein the angle through which the attenuation strip must bend in order to pass through the anvils is adjusted by actuation of the or each anvil perpendicular to the plane of attenuation strip movement.

8. Apparatus according to claim 7, wherein three anvils are provided of which it is a second, central anvil which is actuated perpendicular to the plane of attenuation strip movement.

9. Apparatus according to claim 8, wherein the absorption mechanism comprises a guide clip which secures the second anvil in the pre-excessive G-force weight adjusted position when the weight of the occupant is applied to the seat, and which releases the second anvil from said position during attenuation.

10. Apparatus according to claim 6, wherein the angle through which the attenuation strip must bend in order to pass through the anvils is adjusted by actuation of the or each anvil parallel to the plane of attenuation strip movement.

11. Apparatus according to claim 10, wherein three anvils are provided of which it is a first end anvil and a third end anvil which are actuated parallel to the plane of attenuation strip movement.

12. Apparatus according to claim 6, wherein the absorption adjustment mechanism comprises an anvil housing and an outer control casing having an actuation control aperture, the actuation control aperture having a sloped surface configured to retain the or each actuated anvil in an active attenuating position which is perpendicular to the plane of attenuation strip movement by a distance corresponding to a point along the slope at which the anvil resides when in the pre-excessive G-force weight adjusted position.

13. Apparatus according to claim 12, wherein the sloped surface is further provided with a series of notches for retaining the or each anvil at one of a series of incremental distances from the plane of attenuation strip movement when in the active attenuating position.

14. Apparatus according to claims 13, wherein the absorption adjustment mechanism comprises resilient means which support the apparatus such that when the weight of the occupant is applied thereto, the resilient means is resiliently compressed resulting in the second anvil moving into the pre-excessive G-force weight adjusted position, which is substantially perpendicular and opposite to one of the notches, such that upon attenuation, in an explosion event the second anvil is urged against the notch by the attenuation strip, and is thereby held, in the active attenuating position, perpendicular to the plane of attenuation strip movement, by the distance corresponding to that notch.

15. Apparatus according to claim 14, wherein the resilient means comprises a coiled spring member and/or a telescopic strut containing a force dampening fluid.

16. A method of protecting a vehicle occupant from explosion induced G-forces, the method comprising:
   providing a first mounting member attached to the vehicle;
   providing a second mounting member attached to a vehicle seat;
   providing an absorption mechanism between the first and second mounting members, wherein the absorption mechanism comprises an attenuation strip provided on one of the mounting members and an anvil provided on the other of the mounting members such that when the vehicle, and hence the first mounting member, is subjected to an explosion induced G-force, the attenuation strip is bent and pulled over the anvil in order to absorb a portion of the G-force which would otherwise be imparted on the occupant; and controlling the movement of the seat relative to the vehicle by adjusting frictional attenuation force by way of an absorption adjustment mechanism which increases the magnitude of attenuation by increasing the frictional attenuation force created as a result of the action of the attenuation strip being bent and pulled through the anvils, as the weight of the occupant is increased such that a substantially similar length of attenuation strip is bent and pulled through the anvils for a given G-force regardless of the occupant's weight.

17. A method according to claim 16, further comprising automatically retaining an anvil in a pre-excessive G-force weight adjusted position which is substantially perpendicular to the plane of attenuation strip movement, by an amount which increases the frictional attenuation force applied as a result of the attenuation strip being pulled through the anvils, to a magnitude which is suited to that occupant's weight.

18. A method according to claim 16, comprising the further step of protecting the vehicle occupant from rebound G-forces when the vehicle impacts with the ground after the explosion event by providing a rebound energy absorption system comprising at least one of a coiled spring member, a telescopic strut and an unused length of the attenuation strip.

* * * * *